United States Patent Office 3,586,726
Patented June 22, 1971

3,586,726
ETHYLIDENEBICYCLOHEPTENE
Kenneth E. Atkins, South Charleston, W. Va., Henry E. Fritz, Tarrytown, N.Y., and David W. Peck, Charleston, W. Va., assignors to Union Carbide Corporation
No Drawing. Filed Feb. 9, 1967, Ser. No. 614,802
Int. Cl. C07c 5/24, 13/28
U.S. Cl. 260—666A
10 Claims

ABSTRACT OF THE DISCLOSURE

Ethylidenebicycloheptene is produced by the catalytic isomerization of vinylbicycloheptene at elevated temperatures. The catalysts are the complex compositions obtained by the reduction of the salts of the transition metals cobalt and iron with hydrocarbylaluminum compounds, and the carbonyl compounds of said transition metals. Ethylidenebicycloheptene is a known compound useful as a comonomer in the production of ethylene-propylene terpolymers.

SPECIFICATION

This invention is concerned with a novel catalytic process for the production of 5-ethylidenebicyclo[2.2.1]hept-2-ene.

Non-conjugated diolefins whose double bonds are of unequal reactivity are useful as termonomers in the production of ethylene propylene terpolymer rubbers or elastomers. The unequal reactivity is desired in order to enable one to produce the terpolymer via the more reactive double bond and leave the less reactive double bond available for the subsequent vulcanization step. Among the patents concerned with this problem one can mention U.S. 3,000,866, U.S. 3,063,973, U.S. 3,093,620, U.S. 3,093,621 U.S. 3,151,173 and British 880,904.

One of the structures of interest is the alkylidenenorbornene type compounds of the general formula:

wherein R is a divalent alkylidene radical of at least two carbon atoms and in which 5-ethylidenebicyclo[2.2.1]hept-2-ene is the first member of the series. The production of such compounds from 2-alkylbicyclo[2.2.1]hepta-2,5-dienes has been disclosed by J. L. Nyce in U.S. 3,151,173.

It has now been found that 5-ethylidenebicyclo[2.2.1]hept-2-ene can be produced by the catalytic isomerization of 5-vinylbicyclo[2.2.1]hept-2-ene with certain specific catalysts. 5-vinylbicyclo[2.2.1]hept-2-ene is a known compound which is readily prepared by the Diels-Alder reaction of cyclopentadiene with butadiene.

The catalysts used in the process of this invention are the iron carbonyls, the cobalt carbonyls, and the complex catalyst compositions obtained by the reduction of cobalt and iron salts with a hydrocarbylaluminum compound, preferably an alkylaluminum compound. The isomerization can be carried out in the absence of, or in the presence of an inert organic diluent such as pentane, haxane, heptane, octane, cyclopentane, cyclohexane, methylcyclohexane, benzene, toluene, xylene, kerosene, carbon tetrachloride, tetrachloroethylene, and the like.

Among the suitable carbonyl compounds are dicobaltoctacarbonyl, tetracobaltoctacarbonyl, iron tetracarbonyl, iron pentacarbonyl, iron nonacarbonyl, and the like.

Suitable iron and cobalt salts include the inorganic and organic salts. The preferred salts are those which are soluble to some extent in the reaction system since they give a faster reaction. Exemplary thereof one can mention ferric acetylacetonate, ferrous acetylacetonate, ferrous acetate, ferric benzoate, ferrous bromide, ferric bromide, ferous cabonate, the iron chlorides, fluorides and iodides, ferric citrate, ferric maleate, ferrous lactate, ferrous nitrate, ferric nitrate, ferrous oxalate, ferrous sulfate, ferric sulfate, ferrous tartrate, ferrous oleate, ferric oleate, and the like; cobaltic acetylacetonate, cobalt 2-ethylhexanoate, cobaltous chloride, cobaltous acetate, cobaltic acetate, cobaltous benzoate. the cobalt bromides, fluorides, iodides and chlorides, cobaltous bromate, cobaltous carbonate, cobaltous chromate, cobaltous citrate, cobaltous ferricyanide, cobaltous formate, cobaltic hydroxide, cobaltous linoleate, cobaltous oleate, cobaltous oxalate, cobaltous palmitate, cobaltous sulfate, cobaltic sulfate, cobaltic tartrate, diamminecobalt (II) chloride, hexamminecobalt (II) chloride, hexamminecobalt (III) chloride, and the like.

The suitable hydrocarbylaluminum compounds used to reduce the cobalt and iron salts are well known and are generally used for the preparation of polymerization catalysts. These compounds include the trihydrocarbylaluminum compounds, the hydrocarbylaluminum halides, and the hydrocarbylaluminum hydrides. Among the suitable hydrocarbylaluminum compounds are those which have at least one aluminum to carbon bond such as the trialkylaluminum compounds, the triarylaluminum compounds, the dialkylaluminum hydrides, the diarylaluminum hydrides, the dialkylaluminum halides, the diarylaluminum halides, the alkylarylaluminum halides, the monoalkylaluminum dihydrides, the monoarylaluminum dihydrides, the monoalkylaluminum dihalides, the monoarylaluminum dihalides, and the like. Illustrative thereof one can mention trimethylaluminum, triethylaluminum, tripropylaluminum, triisopropylaluminum, tri-n-butylaluminum, triisobutylaluminum, trihexylaluminum, trioctylaluminum, tridecylaluminum, tridodecylaluminum, tribenzylaluminum, triphenylaluminum, tritolylaluminum, trinaphthylaluminum, dimethylaluminum hydride, diisobutylaluminum hydride, dihexylaluminum hydride, didecylaluminum hydride, dimethylaluminum chloride, diisobutylaluminum chloride, diethylaluminum bromide, diphenylaluminum chloride, ditolylaluminum chloride, diphenylaluminum hydride, dixylylaluminum hydride, dinaphthylaluminum hydride, methylphenylaluminum monohydride, ethylnaphthylaluminum monohydride, ethylnaphthylaluminum monochloride, methylaluminum dihydride, ethylaluminum dihydride, isobutylaluminum dihydride, octylaluminum dihydride, dodecylaluminum dihydride, methylaluminum dichloride, ethylaluminum dichloride, ethylaluminum dibromide, isobutylaluminum dichloride, decylaluminum dichloride, phenylaluminum dihydride, tolylaluminum dihydride, naphthylaluminum dihydride, phenylaluminum dichloride, naphthylaluminum dichloride and the like. Also suitable are their complexes such as the alkali metal aluminum tetraalkyls and alkyl hydrides, as for example lithium aluminum tetraalkyls, sodium aluminum tetraalkyls, sodium aluminum trialkyl hydride, and the like.

In producing the reduced iron and cobalt complex catalyst compositions it is preferred to have at least stoichiometric quantities of the iron salt or cobalt salt and the hydrocarbylaluminum compound in order that the iron or cobalt salt be fully utilized; preferably a slight excess of hydrocarbylaluminum compound is used to reduce the iron or cobalt salt to its catalytically active form.

The concentration of the iron carbonyl or cobalt carbonyl can vary from about 0.1 to about 10 parts by weight based on the weight of the 5-vinylbicyclo[2.2.1]hept-2-ene charged; preferably from about 1 to about 5 parts by weight.

The total concentration of the iron salt or cobalt salt plus the reducing hydrocarbylaluminum compound also varies from a total of about 0.1 part to about 10 parts by weight. This total concentration, of course, is composed of the two components preferably, though not necessarily, in at least stoichiometric quantities as previously indicated; however, the proportion of each component is not critical. The amount of cobalt salt or iron salt can vary from about 0.1 to about 10 parts by weight, preferably from about 0.5 to 2 parts by weight of 5-vinylbicyclo [2.2.1]hept-2-ene; the amount of hydrocarbylaluminum compound is desirably at least a stoichiometric amount and can vary from about 0.2 to about 10 parts by weight, preferably from about 1 to about 4 parts per 100 parts by weight of 5-vinylbicyclo[2.2.1]hept-2-ene.

The isomerization is carried out at an elevated temperature of from about 75° C. to about 200° C. However, because of competing reactions (e.g. rearrangement of 5-vinylbicyclo[2.2.1]hept-2-ene to 4,5,8,9-tetrahydroindene) at higher temperatures, it is preferred to operate at below about 180° C., preferably from about 80° C. to about 180° C. and most preferably from about 120° C. to about 170° C. The reaction can be carried out continuously or in a batchwise manner. The pressure can be atmospheric but superatmospheric pressure is preferred in order to keep the reactants and products in the liquid phase. At the conclusion of the reaction period, the 5-ethylidenebicyclo[2.2.1]hept-2-ene is recovered by conventional procedures, e.g. fractional distillation.

The following examples further serve to illustrate this invention.

EXAMPLE 1

A reaction flask was equipped with a stirrer and reflux condenser and 87 grams of 5-vinylbicyclo[2.2.1]hept-2-ene and 1 gram of cobaltic acetylacetonate were added. The flask was purged with nitrogen and 2 milliliters of triisobutylaluminum were added below the surface of the liquid. The contents were heated rapidly to a reflux temperature of 144° C. and samples were removed periodically and analyzed by vapor phase chromatography to determine the extent to which isomerization to 5-ethylidenebicyclo[2.2.1]hept-2-ene had occurred. It was found that isomerization to 5-ethylidenebicyclo[2.2.1]hept-2-ene had progressed to the extent of 74% at the end ¼ hour; after ½ hour to the extent of 84%; after 1 hour to the extent of 90%; after 2 hours to the extent of 94%; and after 3 hours to the extent of 96% of the distillable materials. At the end of the 3 hour period, after complete distillation, a residue of 13 grams of high boiling products remained.

EXAMPLE 2

The reaction of Example 1 was repeated at a temperature that did not exceed 120° C. After 5½ hours, 90% of the distillable material was 5-ethylidenebicyclo[2.2.1] hept-2-ene and 10% was 5-vinylbicyclo[2.2.1]hept-2-ene. The residue consisted of 15 grams of high boiling products.

EXAMPLE 3

The reaction of Example 1 was repeated using 4 milliliters of triisobutylaluminum to prepare the catalyst complex. After 3 hours the ratio of 5-vinylbicyclo[2.2.1]hept-2-ene to 5-ethylidenebicyclo[2.2.1]hept-2-ene was 6:94 and the high boiling residue after distillation weighed 17 grams.

EXAMPLE 4

In a manner similar to that described in Example 1, 5 ml. of cobalt naphthenate solution containing six percent cobalt and 4 milliliters of triisobutylaluminum were used in the isomerization reaction. After 4 hours at a reflux temperature of 141–148° C. the 5-vinylbicyclo[2.2.1]hept-2-ene to 5-ethylidenebicyclo[2.2.1]hept-2-ene ratio was 3:97.

EXAMPLE 5

In a manner similar to that described in Example 1, 5-vinylbicyclo[2.2.1]hept-2-ene was isomerized at a reflux temperature of about 141–148° C. using as the catalyst complex 5 ml. of a tetralin solution of cobalt 2-ethylhexanoate containing 6 percent cobalt and 4 milliliters of triisobutylaluminum. At the end of a 2 hours reaction period the ratio of 5-vinylbicyclo[2.2.1]hept-2-ene to 5-ethylidenebicyclo[2.2.1]hept-2-ene recovered was 3:97.

EXAMPLE 6

In a manner similar to that described in Example 1, 5-vinylbicyclo[2.2.1]hept-2-ene was isomerized using as a catalyst composition a mixture of 4 milliliters of triisobutylaluminum and 1 gram of anhydrous cobaltous chloride. After a 4 hour reaction period the ratio of 5-vinylbicyclo-[2.2.1]hept-2-ene to 5-ethylidenebicyclo[2.2.1]hept-2-ene was 26:73.

EXAMPLE 7

In a manner similar to that described in Example 1, 5-vinylbicyclo[2.2.1]hept-2-ene was isomerized using as a catalyst composition a mixture of 4 milliliters of triethylaluminum and 1 gram of cobaltic acetylacetonate. At the end of a 4 hour reaction period the ratio of 5-vinylbicyclo[2.2.1]hept-2- ene to 5-ethylidenebicyclo[2.2.1]hept-2-ene was 28:71.

EXAMPLE 8

In a manner similar to that described in Example 1, 5-vinylbicyclo[2.2.1]hept-2-ene was isomerized using as a catalyst composition 4 milliliters of triisobutylaluminum and 1 gram of ferric acetylacetonate. At the end 2 hours the ratio of 5-vinylbicyclo[2.2.1]hept-2-ene to 5-ethylidenebicyclo[2.2.1]hept-2-ene in the reaction product was 88:12.

EXAMPLE 9

In a manner similar to that described in Example 8, 5-vinylbicyclo[2.2.1]hept-2-ene was isomerized using ferrous acetylacetonate instead of ferric acetylacetone. After 2 hours the ratio of 5-vinylbicyclo[2.2.1]hept-2-ene to 5-ethylidenebicyclo[2.2.1]hept-2-ene in the reaction product recovered was 91:9.

Examples 8 and 9 show that iron salts can be used as one of the components of the catalyst composition but that they are not as efficient as the cobalt salts.

EXAMPLE 10

A reaction flask was charged with 60 grams of 5-vinylbicyclo[2.2.1]hept-2-ene and 4 milliliters of triisobutylaluminum in benzene and 1 milliliter of cobalt acetylacetonate in benzene were added. The mixture was permitted to stand at room temperature for 1.5 hours; no evidence of isomerization was found at the end of this period. The mixture was then heated at 80° C. for 25¾ hours and fractionally distilled. It was found that the ratio of 5-vinylbicyclo[2.2.1]hept-2-ene to 5-ethylidenebicyclo[2.2.1]hept-2-ene was 88:12.

This example shows that some isomerization will occur at 80° C. but that the extent thereof is not commercially satisfactory.

EXAMPLE 11

A reaction flask was charged with 25 grams of 5-vinylbicyclo[2.2.1]hept-2-ene and 5 ml of a 15% solution of 5-vinylbicyclo[2.2.1]hept-2-ene and 20 ml of a 15% hours at 120° C. no isomerization was observed. An additional 2 ml of dicobaltoctacarbonyl solution was added and heating was continued for a total of 22 hours. The ratio of 5-vinylbicyclo[2.2.1]hept-2-ene to 5-ethylidenebicyclo[2.2.1]hept-2-ene at the end of that period of time was 85:15.

EXAMPLE 12

A 1 liter rocker autoclave was charged with 100 grams of 5-vinylbicyclo[2.2.1]hept-2-ene and 20 ml. of a 15% solution of dicobaltoctacarbonyl in toluene. The autoclave was pressurized with hydrogen and heated to 120° C. for 1 hour. The autoclave was cooled and the reaction mixture was fractionally distilled. The ratio of 5-vinylbicyclo[2.2.1]hept-2-ene to 5-ethylidenebicyclo[2.2.1]hept-2-ene was 72:28.

EXAMPLE 13

An autoclave was charged with 100 grams of 5-vinylbicyclo[2.2.1]hept-2-ene and 5 ml. of iron pentacarbonyl and heated at 120° C. for 2 hours. The ratio of 5-vinylbicyclo[2.2.1]hept - 2 - ene to 5-ethylidenebicyclo[2.2.1]hept-2-ene in the product mixture was 91:9.

Examples 11–13 show that the iron and cobalt carbonyl compounds are suitable catalysts for the isomerization of 5-vinylbicyclo[2.2.1]hept - 2-ene to 5-ethylidenebicyclo-[2.2.1]hept-2-ene even though they are not as effective as are the complex compositions produced by the reduction of the cobalt salts with a hydrocarbylaluminum compound.

What is claimed is:

1. A process for producing 5-ethylidenebicyclo[2.2.1]-hept-2-ene which comprises contacting at an elevated temperature of from about 75° C. to about 200° C. 5-vinylbicyclo[2.2.1]hept-2-ene with a catalyst composition selected from the group consisting of:
   (a) a complex of a member selected from the group consisting of cobalt salts and iron salts and a hydrocarbylaluminum compound, and
   (b) a carbonyl selected from the group consisting of iron carbonyls and cobalt carbonyls.
2. A process as claimed in claim 1 wherein the catalyst is an iron carbonyl.
3. A process as claimed in claim 1 wherein the catalyst is a cobaltcarbonyl.
4. A process as claimed in claim 1 wherein the catalyst complex is a reaction product of a cobalt salt and a hydrocarbylaluminum compound.
5. A process as claimed in claim 1 wherein the catalyst complex is the reaction product of an iron salt and a hydrocarbylaluminum compound.
6. A process as claimed in claim 1 wherein the catalyst is dicobaltoctacarbonyl.
7. A process as claimed in claim 1 wherein the catalyst is iron pentacarbonyl.
8. A process as claimed in claim 1 wherein the catalyst complex is a reaction product of cobaltic acetylacetonate and triisobutylaluminum.
9. A process as claimed in claim 1 wherein the catalyst complex is a reaction product of cobalt 2-ethylhexanoate and triisobutylaluminum.
10. A process as claimed in claim 1 wherein the catalyst complex is the reaction product of cobaltic acetylacetonate and triethylaluminum.

References Cited

UNITED STATES PATENTS

| | | | |
|---|---|---|---|
| 3,304,269 | 2/1967 | Kroll | 260—2 |
| 3,306,951 | 2/1967 | Lapporte | 260—683.2 |
| 3,308,177 | 3/1967 | Atkins | 260—666A |
| 3,317,620 | 5/1967 | Wilke et al. | 260—666B |
| 3,375,287 | 3/1968 | Tinsky | 260—666A |
| 3,377,398 | 4/1968 | Zoche | 260—666A |

OTHER REFERENCES

J. E. Arnet, J. Amer. Chem. Soc., 83, pp 2954–5, 1961.

DELBERT E. GANTZ, Primary Examiner

V. O'KEEFE, Assistant Examiner